United States Patent [19]

Latta et al.

[11] Patent Number: 5,233,175
[45] Date of Patent: Aug. 3, 1993

[54] LASER POWER CONTROL INDEPENDENT OF BEAMSPLITTER TRANSMISSIVITY

[75] Inventors: Milton R. Latta, San Jose, Calif.; Timothy S. Gardner, Tucson, Ariz.

[73] Assignee: International Business Machines, Armonk, N.Y.

[21] Appl. No.: 934,704

[22] Filed: Aug. 24, 1992

[51] Int. Cl.⁵ ............................ G01J 1/32; G11B 7/00
[52] U.S. Cl. ..................................... 250/205; 369/116
[58] Field of Search ............................ 250/201.5, 205; 369/116, 44.41, 44.42

[56] References Cited

U.S. PATENT DOCUMENTS

| | | | |
|---|---|---|---|
| 4,858,219 | 8/1989 | Yoshikawa et al. | 369/116 |
| 4,881,216 | 11/1989 | Deguchi et al. | 369/116 |
| 4,908,815 | 3/1990 | Gregg et al. | 369/116 |
| 4,982,389 | 1/1991 | Nakao et al. | 369/13 |
| 4,989,198 | 1/1991 | Kojima et al. | 369/116 |
| 5,014,253 | 5/1991 | Morimoto et al. | 369/13 |
| 5,023,860 | 6/1991 | Ueda | 250/201.5 |
| 5,115,423 | 5/1992 | Maeda et al. | 250/201.5 |

*Primary Examiner*—David C. Nelms
*Assistant Examiner*—Michael Messinger
*Attorney, Agent, or Firm*—Greenlee and Winner

[57] ABSTRACT

An optoelectronic system for controlling laser drive current to produce a power level at the target independent of changes in the transmissivity of a beamsplitter positioned in the optical path between the laser source and the target. A second beamsplitter with transmissivity and reflectivity factors matched to the first beamsplitter is used to direct portions of light to two photodetectors. The two photodetectors are connected to circuits which produce a signal proportional to the power transmitted by the first beamsplitter divided by the power reflected by the second beamsplitter, that quotient multiplied by the sum of the photodetector signals to produce a final detection signal which is used as input to the servo control of laser drive current.

4 Claims, 2 Drawing Sheets

LASER POWER CONTROL INDEPENDENT OF BEAMSPLITTER TRANSMISSIVITY

This invention relates to optoelectronic systems for compensating temperature and humidity sensitivities in laser power control apparatus.

BACKGROUND OF THE INVENTION

Optical disk devices are used for the storage of computer-prepared data and have recognized value in their ability to store large quantities of data. The media for use in such devices is reactive to the intensity modulation of light, such as may be produced by the rapid switching of a semi-conductor laser. In order to write data on optical media, the laser power must be controlled at a relatively high power level, in order that the media can be altered in accordance with the input data stream. In reading the data back, the laser power level is controlled at a lower level so that the media is not altered by the laser beam, but the reflected light indicates the presence or absence of media alterations caused by the input data stream.

In operating an optical disk system, it is necessary to set the correct laser power level to read and to write for each optical disk. The correct parameters for the optical disk are included in information in an identification header stamped onto the disk itself. That information, when read by the system, enables a calibration circuit to set the desired current levels for the laser to produce the correct laser power. Since, however, the laser is subject to unintended changes in its operating parameters, particularly with temperature and aging, the calibration method is also used to change current levels for the laser so that the expected power level is maintained under operating conditions and throughout laser life.

The common practice of calibrating laser circuits to operate with a given optical medium usually involves producing the desired laser light intensity at the target (optical medium). To do that, laser control circuits are set to produce the predetermined or desired light intensity at the optical medium. Analysis is conducted to determine digital-to-analog converter (DAC) settings to produce the laser power needed in the writing and the erasing operations. Additionally, read power levels are established.

The initial analysis is conducted on the manufacturing line so that correct values are established within the control system. These initially established values that include the relationship between power sensed at a photodetector to the total power produced by the laser to gain an accurate measure of the power incident on the target (optical medium). Thereafter, during operation, changes in power sensed by the photodetector cause the control circuit to alter the current driving the laser in order to bring power at the photodetector back to the desired level. In that manner, it is believed that power at the optical disk will be produced at the correct value.

In order to provide a portion of the power produced by the laser to the photodetector, a beamsplitter is placed in the optical path to divert a small portion of the power to the photodetector. As long as the power received at the photodetector accurately reflects changes in the power produced by the laser, the circuit works properly. However, should the power at the photodetector change independently of power produced by the laser there would be an alteration of the current driving the laser independent of the objectives of the control system. It has been found that such a problem does occur when the effects of temperature and humidity, that is ambient operating conditions, cause a change in the power received by the photodetector which is independent of changes at the laser source. Such independent changes are largely due to changes in the transmissivity and the reflectivity of the beamsplitter. Attempts have been made to produce a prism whose reflective coating does not change with temperature and humidity but the small tolerances required result in very expensive parts. The inventors herein have taken a different approach and have produced a system that is relatively free of changes in transmissivity and reflectivity within the optical system while maintaining the cost of the system at a reasonable level.

SUMMARY OF THE INVENTION

Briefly stated, this invention provides an optical system with a matched pair of beamsplitters, that is, two cubes with the same reflectivity and transmissivity. The two cubes are used with a semiconductor laser source and with laser drive electronics to produce a system that is independent of changes in transmissivity. The system provides laser power at the target controlled to a desired level even though temperature or humidity conditions cause change in the transmissivity of the cubes.

The system uses one of the matched beamsplitters to transmit light from the laser source to the target and to reflect a portion of the laser power into a servo system for controlling laser power to the desired level. The second of the matched beamsplitters receives reflected light from the first beamsplitter and transmits a portion of that light to a first photodetector; the remaining portion of the light is reflected to a second photodetector. Current produced by the two photodetectors is introduced into electronic circuits to establish a laser drive current producing laser power at the target in a manner independent of changes in the transmissivity of the beamsplitter.

DETAILED DESCRIPTION

Figure 1:
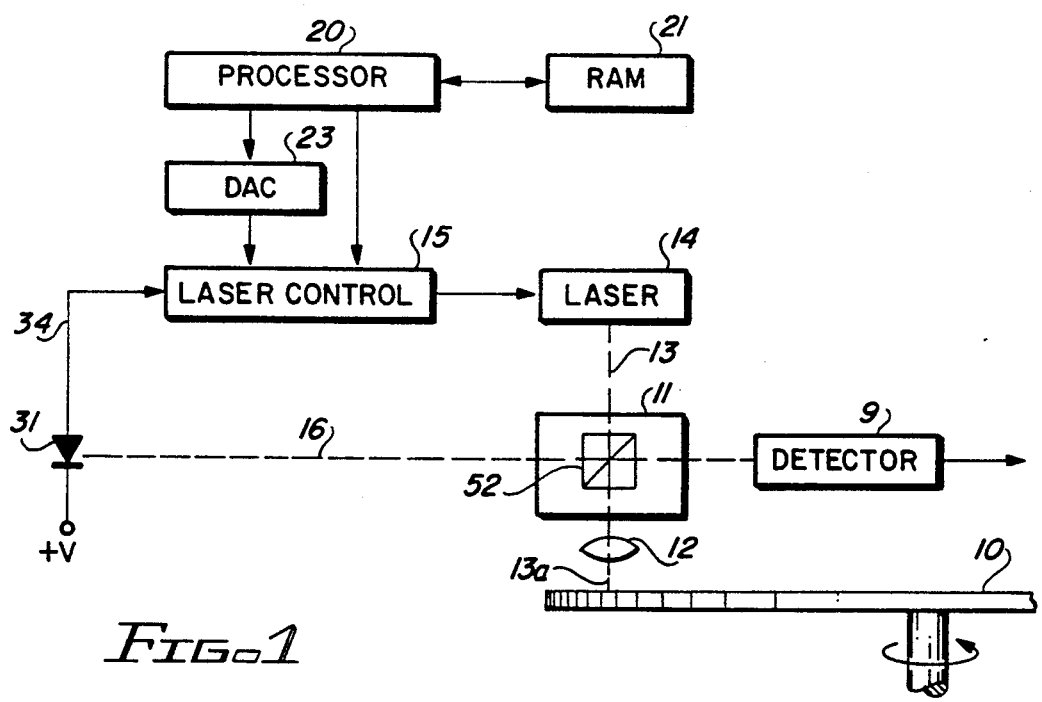
FIG. 1 shows a typical optoelectronic system for controlling laser power incident upon an optical disk.

When reference is made to the drawing, like numerals will indicate like parts and structural features in the various figures.

In FIG. 1, an optical disk 10 is suitably mounted for rotation in an optical disk recorder, the mechanical details of which are not shown. FIG. 1 shows a laser generator 14 producing a main light beam over light path 13 to an optical system 11 which includes beamsplitter 52 for supplying a main portion of the light beam generated by laser 14 through objective lens 12 over light path 13a to disk 10. Light reflected from disk 10 travels over the same path 13a and through objective lens 12 to beamsplitter 52 where a portion of the beam is fed back over light path 13 to the laser 14 as well as providing a portion to the detector 9.

The system shown in FIG. 1 is under control of a programmed processor 20 which has a random access memory (RAM) 21. Microprocessor 20 supplies a digital value to digital to analog converter (DAC) 23. DAC 23 supplies an analog signal to the laser control circuit 15 for setting the nominal beam intensity emitted by laser 14 to optical elements 11. The intensity of the laser output further includes modulation based upon data as supplied by microprocessor 20 or other data handling circuits. Control line 24, extending from processor 20 to the laser control circuits 15, signifies additional mode control for controlling the laser control circuits 15.

Laser generator 14 is controlled in intensity by a feedback circuit in laser control 15. The beamsplitter 52 in optics 11 sends a portion of the laser beam over light path 16 to a photodiode 31. The photocurrent amplitude produced from photodiode 31 varies in accordance with the light power produced from laser 14. The output of photodiode 31 is connected to laser control circuit 15. Under normal operations, laser control 15 responds to the signal level on line 34 to maintain the operation of the laser 14 at predetermined nominal light intensity values.

Figure 2:
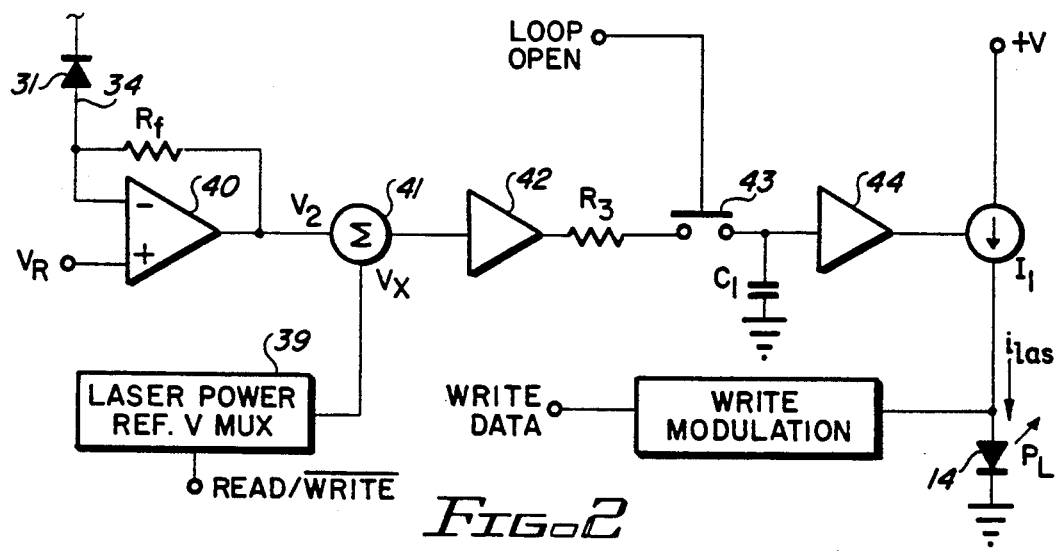
FIG. 2 shows a typical servo system for controlling laser drive current in the optoelectronics of FIG. 1.

FIG. 2 is a representation of a prior art circuit for use as the laser control 15 in FIG. 1. Laser 14 emits light with a power level $P_L$, and a portion of that light is received at photodiode 31. The voltage present on line 34 is proportional to the amount of light received by the photodetector 31. That voltage is fed into a transimpedence amplifier 40 and compared to a reference voltage $V_R$. Amplifier 40 drives an output voltage $V_a$ such that $V_a$ is equal to the reference voltage $V_R$ minus the voltage drop across $R_f$ which is proportional to the current produced by photodetector 31. The operation of the laser power servo loop, shown in FIG. 2, is to force the current produced by the photodetector to a level such that $V_a$ is substantially equal to a reference power voltage $V_X$. $V_a$ is provided to a summing circuit 41, where it is summed with a power reference voltage $V_X$ to produce an error voltage in the system. That is to say the difference between $V_a$ and $V_X$ is representative of an error voltage.

$V_X$ is the laser power reference voltage, which may be, for example, a voltage proportional to a 2 milliwatt output by laser 14 for a read operation, or a voltage which is proportional to a 0.5 milliwatt output by laser 14 for a baseline write operation. By "baseline write", it is meant that during a write operation, at the baseline power level, no alterations are written on the optical disk. The multiplexor 39 provides a reference voltage to the summing circuit 41. The error voltage, that is the output of summing circuit 41, is amplified by amplifier 42, and with the loop closed by digital switch 43, the error voltage appears across capacitor $C_1$. The error voltage is amplified by transconductance amplifier 44 to alter the laser drive current $i_{las}$ in accordance with the error voltage. With the system in balance, $i_{las}$ will be at a current level that drives laser 14 to produce a power output that is at a level for producing a zero error voltage.

During a write operation, when alterations of the media are to be written, the current through the laser is modulated to produce, for example, ten milliwatts of power as opposed to the baseline write power level of 0.5 milliwatts. Therefore, each time an alteration, usually signifying a one digit is to be written on the optical disk, the current level $i_{las}$ is switched from that level needed to produce 0.5 milliwatts to a level needed to produce 10 milliwatts.

The loop open switch 43 is operated to open the control loop during a write digit one operation, since the control circuit is designed to maintain laser power at a read power level of, for example, 2 milliwatts, or at a baseline write level of 0.5 milliwatts.

Figure 3:
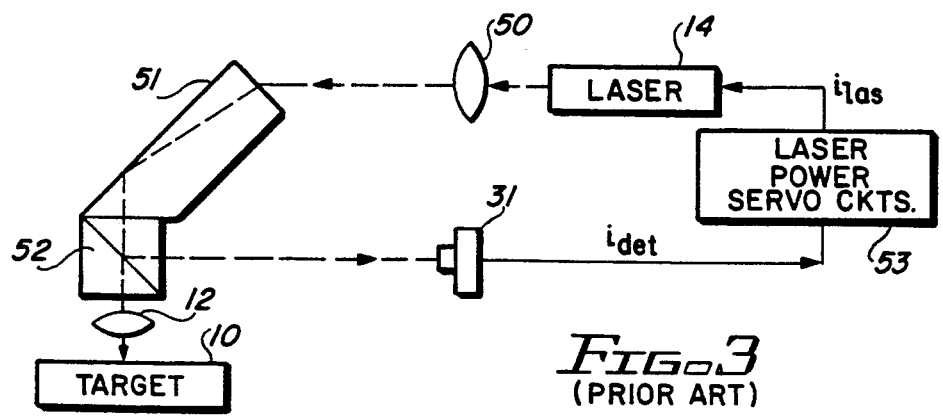
FIG. 3 shows a functional overview of the optics used in the system of FIG. 1.

As mentioned previously, some types of optical media are very sensitive to small changes in incident power. As a result, whether the type of optical storage is write-once, read-only or erasable, it is important that the power incident upon the media be known in an absolute sense. A change in the delivery of a small amount of power to the media can make a large difference in the quality of the data written or read therefrom. In the circuit shown in FIG. 2 the laser is driven at a current level ($i_{las}$) that is designed to provide a certain output at the disk ($P_{disc}$). FIG. 3 is a functional overview of the optical head used with the circuit of FIG. 2. The laser 14 produces a power output ($P_{las}$) which is directed by a collimating lens 50 into a shaping prism 51 and through a partial polarizing beamsplitter 52 to the surface of the target 10 which, in the example illustrated, is an optical disk. A portion ($P_{det}$) of the laser power is split away at the beamsplitter 52 and sent to the photodetector 31. The current produced by the photodetector 31 ($i_{det}$) is proportional in amplitude to the light power received by the photodetector. Photodetector current is provided to power servo electronic circuit 53 for controlling the drive current ($i_{las}$) for driving the laser generator 14. During the initial alignment of the drive on the manufacturing line, a meter is placed in the light path at the position of the target (disk 10) in order to measure power at the target. The laser drive current is adjusted until the desired power at the target is obtained.

It should be noted that the power at the target (disk) is a function of the power transmission, t, of the beamsplitter 52:

$$P_{disc} = KtP_{las} \tag{1}$$

Also note that the power at the photodetector 31 is proportional to the power reflectivity, r, of the beamsplitter 52:

$$P_{det} = KrP_{las} \tag{2}$$

After the initial alignment of the drive on the manufacturing line, a particular laser power will be known to provide the correct power at the disk and associated with that, will be a particular power received by the photodetector. That particular $P_{det}$ will force a certain photocurrent $i_{det}$ to produce the desired $i_{las}$. The servo electronics 53 accomplish setting the desired laser drive current usually by adjusting gain stages of amplifying components. In that manner, the optics and electronics of the head system serve to keep the power at the disk constant by keeping current at the detector constant.

The inventors note that the system described in the prior art can work well as long as the transmissivity and reflectivity of the beamsplitter 52 remain constant. The practical problem involved is that it is difficult to manufacture a prism whose coating does not change with temperature and humidity. Consequently, the inventors have sought to provide a system which is independent of those parameters.

When the transmission and reflection of the beamsplitter is perturbed by environmental extremes, the actual power received at the disk is proportional to power produced by the laser and the altered transmissivity, t', of the prism. Similarly, the power detected by the photodetector is proportional to the power produced by the laser and the altered reflectivity, r', of the prism. In comparing the actual power received at the disk to the desired power at the disk, expression (3) below shows that the ratio is proportional to the reflectivity and the transmissivity of the prism for both the desired level and the actual levels. The expression is:

$$\frac{P_{disc} \text{ actual}}{P_{disc} \text{ desired}} : (r/t)(t'/r') \quad (3)$$

Because of the changes in reflectivity and transmissivity due to changes in temperature or humidity, equation 3 shows that it is impossible to sense the actual power at the disc by sensing the power delivered to the photodetector.

Figure 4:
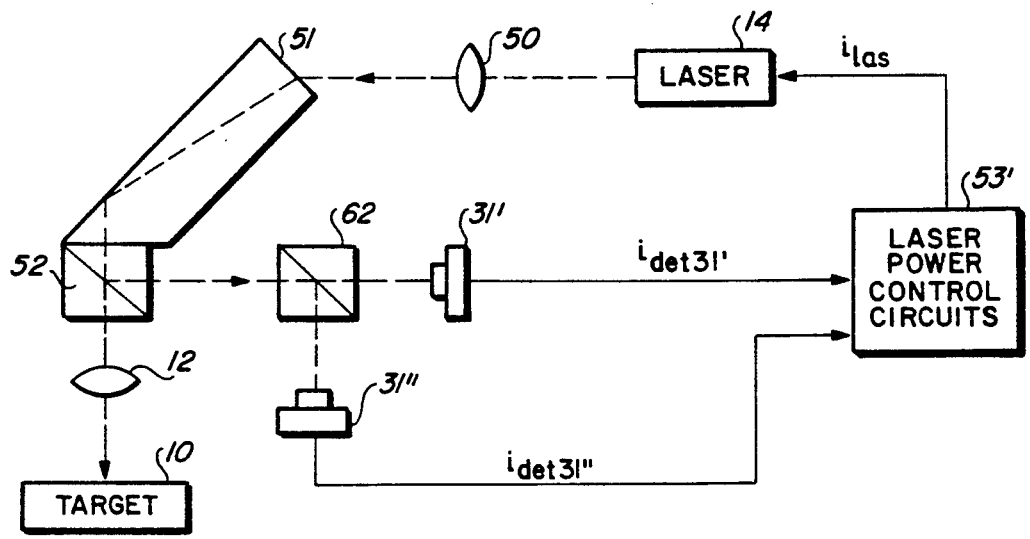
FIG. 4 illustrates the changes to FIG. 3 needed to implement this invention.

FIG. 4 illustrates an altered optical schematic diagram according to this invention which seeks to provide an electrical signal from photodetectors sensing the power produced by the laser that is proportional to the transmission of the beamsplitter at any temperature or humidity. In FIG. 4, a second beamsplitter 62 is added to receive light from beamsplitter 52. That portion of the light transmitted by beamsplitter 62 is received by photodetector 31' while that light reflected by beamsplitter 62 is received by photodetector 31". Current from each of the two photodetectors is presented to the power servo electronics circuit 53' for generating an appropriate drive current for the laser 14.

The purpose of the circuit shown in FIG. 4 is to sense the change in transmissivity by adding the second beamsplitter 62 whose transmissivity and reflectivity changes identically with the primary beamsplitter 52. It is possible to obtain matched pairs of beamsplitters by grouping together neighboring prisms from the same pump-down coating operation.

With reference to FIG. 4, note that the total power incident on beamsplitter 62 is equal to the total power out of the beamsplitter, that is the power at detector 31' plus the power at detector 31". The reflectivity of beamsplitter 62 is determined by the ratio of the reflected power, that is the power at detector 31" over the total power incident on the cube. Therefore, to obtain a measure of the reflectivity of the beamsplitter 62, the power measured at detector 31" is divided by the total power incident on the cube. Since power is proportional to the currents produced by each of the photodetectors, the reflectivity of the cube can be measured by measuring the current produced by each of the two photodetectors.

To summarize the above, note that:

$$P_{det31'} = K(r)(t)P_{Las} \quad (4)$$

and $$r = \frac{P_{det31''}}{(P_{det31'} + P_{det31''})}$$

From the above it follows that:

$$Kt(P_{Las}) = P_{disc} = \left| \frac{P_{det31'}}{P_{det31''}} \right| (P_{det31''} + P_{det31'}) \quad (5)$$

Thus, an expression is produced showing that the power received at the disk is proportional to the power received by the two photodetectors in a manner that is independent of the transmissivity and the reflectivity of the beamsplitters. Consequently, by measuring power at the photodetectors it is possible to control the power produced by the laser to provide a constant power at the disk independent of the changes that may be experienced in the transmissivity and reflectivity of the beamsplitters.

Figure 5:
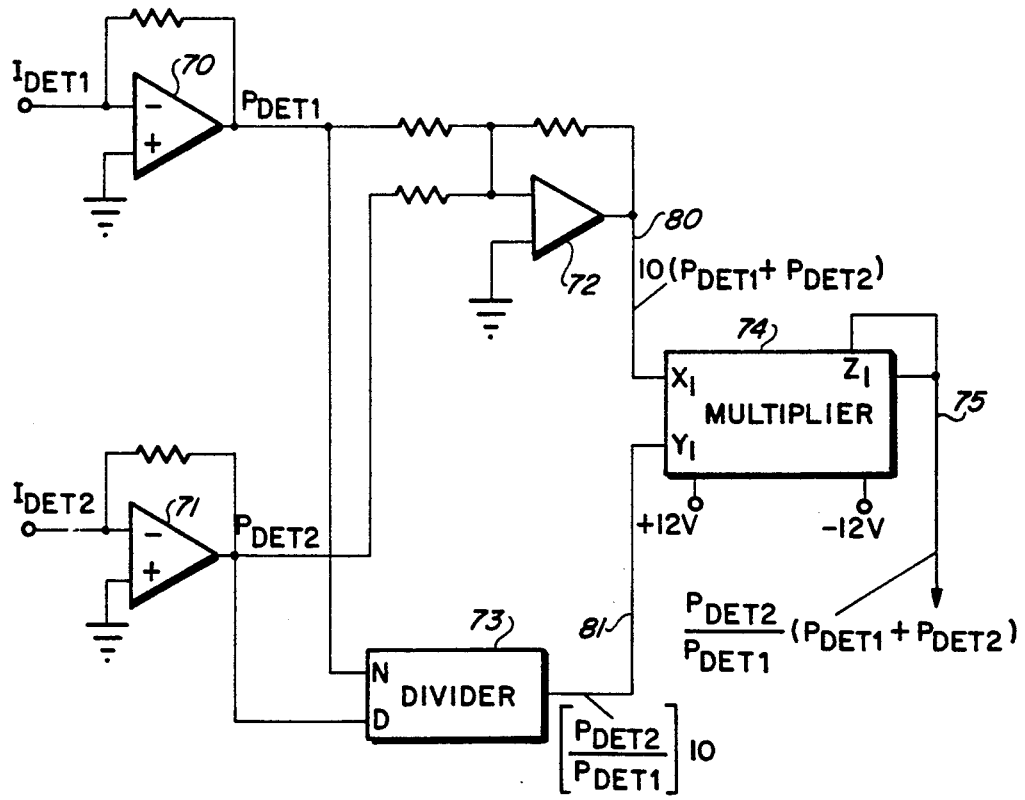
FIG. 5 illustrates electronic circuits for use in the system of FIG. 4 with the servo components of FIG. 2 to achieve the desired laser drive control.

FIG. 5 is an example of an electrical circuit that can be used to process the input from detector 31" and detector 31' to produce the desired control signal. Current from photodetector 31" is amplified by amplifier 70 while the current from photodetector 31' is amplified by amplifier 71. These two quantities are then summed and further amplified at amplifier 72 to produce an output on line 80 which is proportional to the sum of the currents generated at each of the two photodetectors. The output signals of amplifiers 70 and 71 are also sent to a divider circuit 73 to produce an output signal on line 81 proportional to the quotient as shown. That quotient signal is then fed to a multiplier circuit 74 in which it is multiplied by the output of amplifier 72 to produce an output detection signal on line 75 which is in accordance with the expression shown in equation (5). That quantity is then used as input to the amplifier 40 in the circuit shown in FIG. 2 for producing control over the laser drive current, thus achieving control which is independent of changes in the transmisivity and reflectivity of beamsplitter 52.

A system has been described for maintaining power at a target independent of beamsplitter shifts due to temperature and humidity. The invention has been illustrated with reference to an optical disk system but can be used in any laser optical system to maintain constant power at the target in a manner that is independent of beamsplitter shifts due to temperature and humidity.

While the invention has been described above with respect to specific embodiments, it will be understood by those skilled in the art that various changes in form and details may be made therein without departing from the spirit and scope of the invention which receives definition in the following claims.

What is claimed is:

1. An optoelectronic system for controlling laser power received at a target comprising:
   a laser source;
   a first beamsplitter means for receiving light produced by said laser source, for transmitting a first portion of said light to said objective, and for reflecting a second portion of said light, said first beamsplitter means having a certain transmissivity factor and a certain reflectivity factor at given ambient conditions;
   a second beamsplitter means for receiving said second portion of said light, for transmitting a third portion and for reflecting a fourth portion, the transmissivity and reflectivity factors of second beamsplitter means matched to substantially equal the transmissivity and reflectivity factors of the first beamsplitter means;

a first photodetector positioned to receive said third portion of said light;

a second photodetector positioned to receive said fourth portion of said light; and laser drive current control circuit means connected to receive the output current of said first and said second photodetectors and connected to said laser source for producing laser drive current to establish laser power at said target independent of changes in the transmissivity of said first beamsplitter means.

2. The system of claim 1 wherein said target is an optical disk.

3. The system of claim 1 wherein said laser drive current control circuit means further include divider means for producing a signal that is proportional to the output of said first photodetector divided by the output of said second photodetector to produce a quotient signal that is multiplied by the sum of the output signals of said first and second photodetectors to produce a final detection signal, said laser drive current control means acting upon said final detection signal to produce said laser drive current.

4. The system of claim 3 wherein said target is an optical disk.

* * * * *